April 28, 1942.    H. L. NEWELL    2,281,319
CONTROL DEVICE
Filed Dec. 31, 1940    2 Sheets-Sheet 1
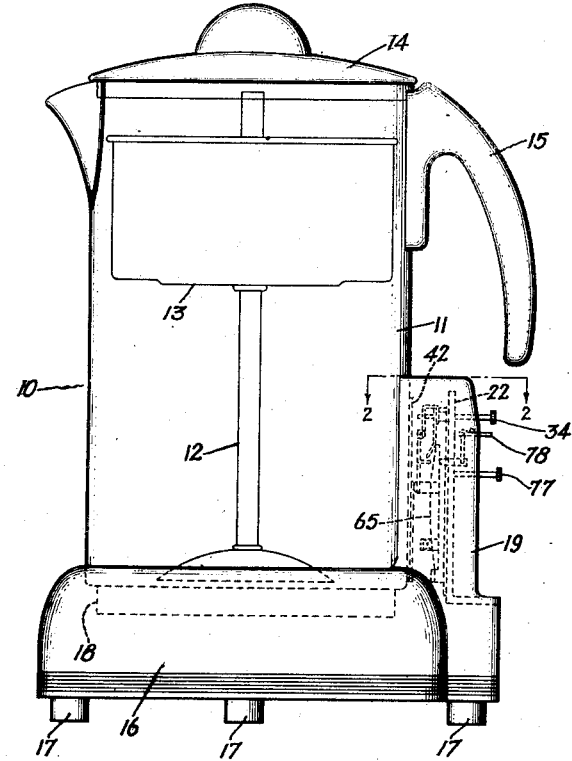
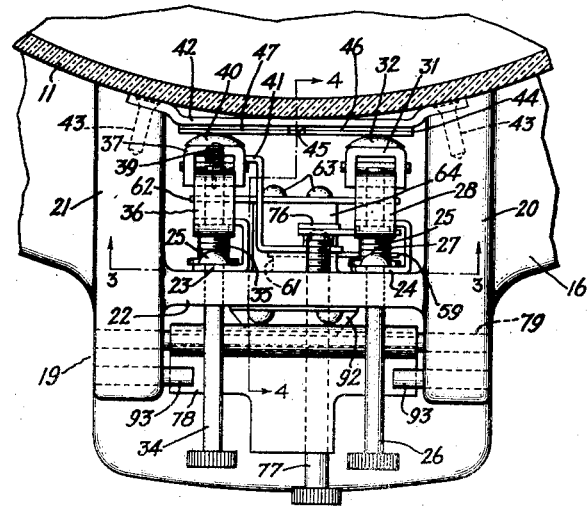
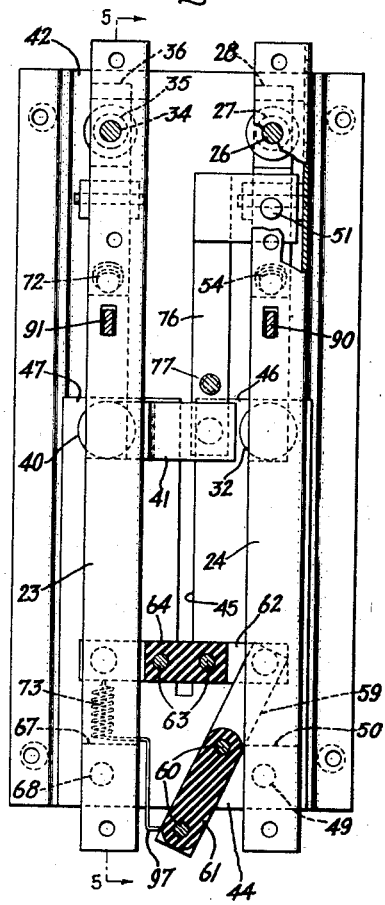
Inventor:
Heber L. Newell,
by Harry E. Dunham
His Attorney.

April 28, 1942.   H. L. NEWELL   2,281,319
CONTROL DEVICE
Filed Dec. 31, 1940   2 Sheets-Sheet 2
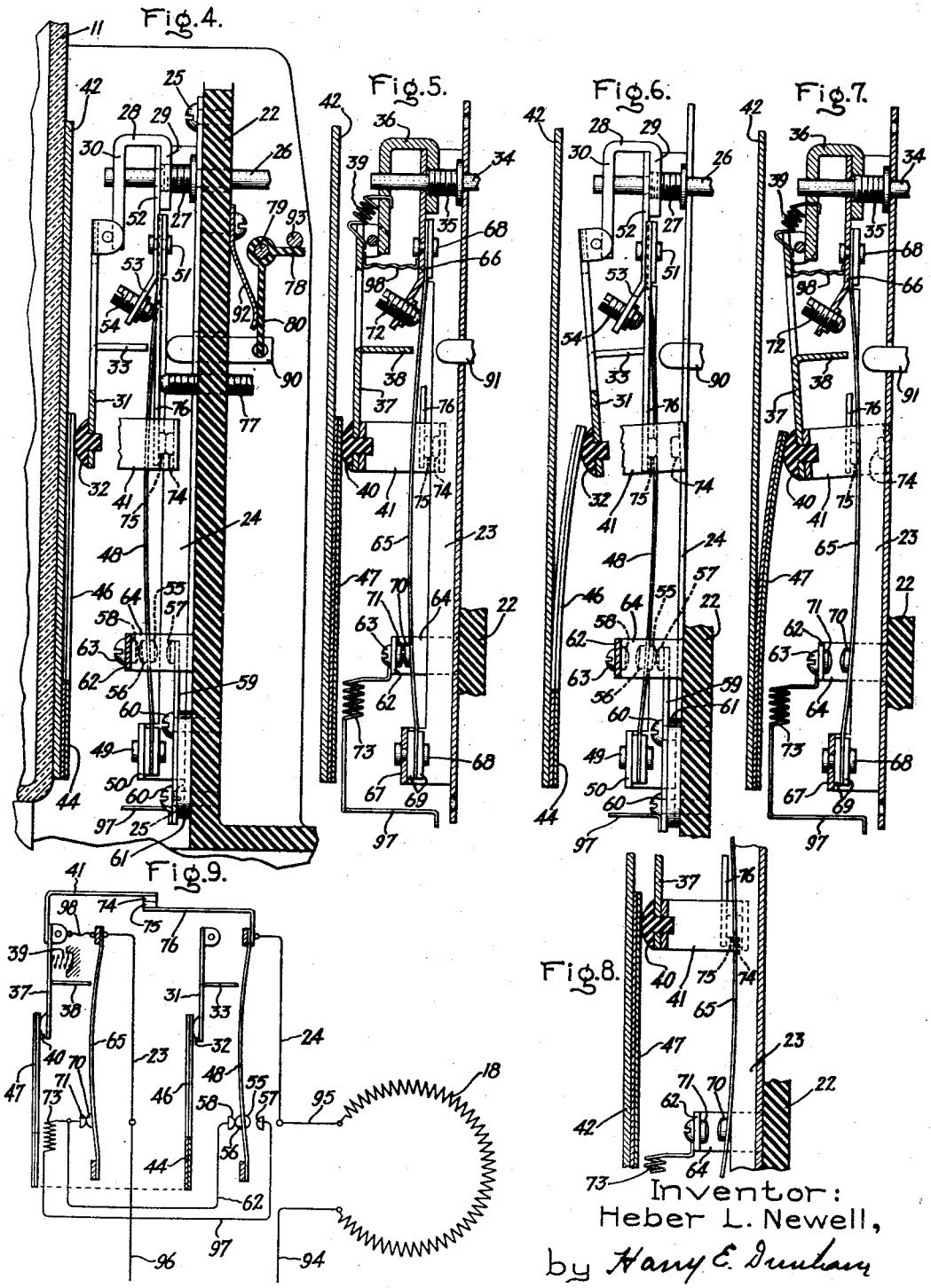
Inventor:
Heber L. Newell,
by Harry E. Dunham
His Attorney.

Patented Apr. 28, 1942

2,281,319

UNITED STATES PATENT OFFICE 2,281,319

CONTROL DEVICE

Heber L. Newell, Bridgeport, Conn., assignor to General Electric Company, a corporation of New York Application December 31, 1940, Serial No. 372,535

13 Claims. (Cl. 219—43)

This invention relates to a control device and more particularly to a control device for a coffee infusion apparatus and has for its primary object the provision of a new and improved control device by which a coffee infusion apparatus may be made fully automatic in its operation.

It is among the objects of this invention to provide a new and improved control device for a coffee maker which is fully automatic in its operation, which insures that the coffee infusion produced in successive operations of the apparatus will be substantially the same as long as the quality of the coffee employed does not change, and by which coffee to suit the taste of the particular user is produced in each operation of the apparatus without any need for guesswork on the part of the user.

More specifically, it is an object of this invention to provide an improved control device for a coffee making apparatus of the percolator type in which the length of the percolation period may be varied to suit the taste of the user and by which the brew, once it has been prepared, will be automatically maintained at the desired drinking temperature after the completion of the brewing period.

It is a further object of this invention to provide a unitary control device for a cooking utensil which is compact in construction and is particularly adapted to be mounted independently of the utensil and yet be readily responsive to temperature changes in the utensil.

It is a further object of this invention to provide a new and improved control device for a coffee maker by which a quantity of water may be preheated to the brewing temperature and maintained at this temperature until it is desired to start the brewing operation.

In accordance with my invention I have provided an automatic control for a coffee making apparatus by which the water to be used in the brewing operation is first brought to a percolating temperature and then is passed over the coffee for a variable length of time depending upon the setting of the control device and by which the brew is automatically maintained at a predetermined temperature after completion of the percolation cycle. In accordance with my invention all three of these functions are performed by a single control device which is mounted so as to be relatively free from ambient temperature changes and to be responsive either to the heat from the coffee making apparatus or to the heat from an auxiliary heating unit.

In one specific embodiment of my invention, the foregoing objects and functions are attained by providing an electrically heated stove for a coffee maker of the percolator type which is preferably of glass. Mounted on this stove so as to be readily responsive to the temperature changes of the fluid within the coffee receptacle and to conform to the general contour of the coffee maker and the stove is a control device by which the heater element within the stove is controlled in accordance with temperature changes of the fluid within the receptacle. This control device includes a unitary bimetallic element the deflection of which performs circuit controlling functions for controlling the heating element of the stove in accordance with temperature changes of the liquid within the receptacle. Also included in the control device is an auxiliary heater which is located adjacent the bimetallic element so that when energized it accelerates the movement of the element. The initial energization of the auxiliary heater is controlled in accordance with the temperature of the fluid in the receptacle and the length of time the auxiliary heater remains energized controls the length of time that the brew is percolated once the water in the coffee receptacle reaches a percolation temperature. Upon the deenergization of this auxiliary heater, the control device is constructed so that the bimetallic element follows the temperature of the brewed coffee and deflects in accordance with temperature changes of this brew to maintain a predetermined lower suitable drinking temperature for the brew.

Thus, in accordance with this specific embodiment of my inventon, I have provided a new and improved control device by which cold water and coffee may be placed in a coffee infusion apparatus of the percolator type, may be automatically brewed for a time to suit the taste of the user, and may thereafter be maintained at a suitable drinking temperature.

Further objects and advantages of my invention will become apparent as the following detailed description proceeds and the features of novelty which characterize my invention will be set forth in the claims appended to and forming a part of this specification.

For a fuller understanding of my invention, reference should be had to the accompanying drawings in which Fig. 1 is a side elevation showing my improved control device applied to a coffee infusion apparatus of the percolator type; Fig. 2 is an enlarged fragmentary view taken on the line 2—2 of Fig. 1 looking in the direction of the arrows and showing details of my new and improved control device as applied to a coffee infusion apparatus; Fig. 3 is a view taken on the line 3—3 of Fig. 2 looking in the direction of the arrows, portions of the casing having been omitted; Fig. 4 is a fragmentary sectional view taken on the line 4—4 of Fig. 2 looking in the direction of the arrows and showing details of construction of the right-hand control member of Fig. 2, the control member being shown in its closed circuit controlling position; Fig. 5 is a fragmentary sectional view taken on the line 5—5 of Fig. 3 looking in the direction of the arrows and showing details of construction of the left-hand control member of Fig. 2, this control member being shown in its closed circuit controlling position; Fig. 6 is a view similar to Fig. 4 showing the right-hand control member of Fig. 2 in a different circuit controlling position, the positions of the casing and cooking utensil shown in Fig. 4 being omitted; Fig. 7 is a view similar to Fig. 5 showing the left-hand control member of Fig. 2 in a different circuit controlling position; Fig. 8 is a fragmentary sectional view showing the left-hand control member illustrated in Figs. 5 and 7 in still another circuit controlling position; and Fig. 9 is a wiring diagram showing the manner in which the electrical connections are made to the various elements of the arrangement shown in Fig. 1.

Referring to the drawings, 10 represents a cooking utensil in the form of a coffee infusion apparatus of the percolator type comprising a receptacle 11 in which is mounted a percolator element 12 having a basket 13 adapted to receive the coffee grounds. Provided at the top of the receptacle is a cover 14 and mounted at the side of the receptacle near the top is a suitable handle 15. In the preferred form of my invention the coffee making apparatus 10 will be made of glass so that the brewing operation can be readily viewed. By thus making the coffee maker of glass, the attendant can readily perceive when the coffee has been prepared and can determine by its color whether it has been brewed for a sufficiently long time.

The coffee making apparatus 10 is adapted to be mounted on a suitable electrically heated stove having a casing 16 which is supported by a plurality of supporting members 17. This stove is provided with an electrical heating element which is indicated generally by the dotted portion 18 shown in Fig. 1. This electrical heating element may be of any suitable type but it is preferably an open coil type of heating unit having the minimum amount of thermal inertia. A suitable cord set (not shown) is provided for connecting the terminals of the heating element 18 to a suitable source of supply.

The casing 16 of the stove is preferably molded as a one-piece unit from a suitable phenol condensation material and integrally molded at one side of the casing is a vertically extending housing 19 having side walls 20 and 21 and a rear wall 22. These walls define a substantially rectangular opening which is opened at one side, namely, the side which faces the coffee making receptacle. This open side of the housing is constructed so that the curved contour of the receptacle 11 will lie in close proximity to the adjacent ends of the side walls 20 and 21 when the coffee receptacle is in position on the stove. This upwardly extending housing 19 is adapted to receive the component elements of my improved control device. By providing such an integral housing directly on the stove, all need for electrical apparatus such as conductors, thermostats, etc., on the coffee receptacle is eliminated and the receptacle may be removed and conveniently used without the annoyance and inconvenience caused by such conductors. Moreover, by providing such a housing it is possible to form the base and housing as a single molded unit and thereby to style these elements so that they together with the coffee receptacle make a pleasing and uniform design such as shown in Fig. 1.

Referring now to the enlarged detail views shown in Figs. 2–8 it will be observed that my new and improved control device comprises a pair of vertically extending channel members 23 and 24, which members are rigidly secured to the rear wall 22 of the casing 19 in horizontally spaced relation by means of suitable screws 25. Rotatably mounted in the upper end of the channel member 24 and extending through the rear wall 22 of the housing 19 as shown in Fig. 4 is a shaft 26 upon which is pressed a threaded collar 27 which is adapted to lie between the side walls of the channel member. Adjustably supported on the inner end of the shaft 26 as shown in Fig. 4 is a U-shaped bracket 28 having a leg portion 29, which lies between the walls of the channel member 24 and is threadedly received on the collar 27, and a second leg portion 30 in which is rotatably journaled the extreme left end of the shaft 26. Pivotally mounted on the downwardly projecting end of the leg portion 30 is a downwardly extending arm 31 which is provided at its free end with a button 32 made of some suitable insulating material. Provided intermediate the ends of the arm 31 is a bracket 33 which extends inwardly toward the rear wall 22 of the casing 19 and is preferably formed integral with the arm 31 by a stamping or pressing operation.

Projecting through the upper end of the channel-shaped member 23 is a second shaft 34 which is similar to the shaft 26 and is provided with a threaded collar 35 which lies between the side walls of the channel member. Provided on the inner end of the shaft 34 is a U-shaped bracket 36 which is similar to the bracket 28 and has one leg portion arranged so that it threadedly engages the collar 35. The second leg portion of the bracket 36 has a downwardly projecting end portion and pivotally mounted on this portion is an arm 37 which is provided with an integrally formed outwardly projecting bracket 38. In order to bias the arm 37 to the left as viewed in Fig. 5 there is provided a resilient member 39 which extends between the left-hand leg portion of the U-shaped bracket 36 and the top portion of the arm 37. Provided at the extreme lower end of the arm 37 is an insulating button 40 which is similar to the button 32 and also mounted on the lower end of the arm 37 is a Z-shaped bracket 41 the purpose of which will be more fully described hereinafter.

Arranged to close the open side of said casing 19 is a plate 42 which is preferably of some suitable good heat conducting material. This plate is adapted to be secured to the ends of the side walls 20 and 21 by means of suitable screws 43 and is provided with an offset central portion which is constructed so that when the cooking utensil 10 is in position on the stove the periphery of the utensil will engage the plate 42 at its extreme side portions and in the middle as shown in Fig. 2. Thus heat will be transmitted to the plate 42 by convection, conduction and radiation from the utensil located on the heating element 18.

Secured to the lower end of the plate 42 is a suitable temperature responsive element which is preferably a bimetallic element 44 comprising a strip of invar and a strip of steel having a higher thermal coefficient of expansion securely welded together throughout their length. The bimetallic element 44 is substantially U-shaped in character as shown in Fig. 3 and is preferably formed by providing a suitable slot 45 in a rectangular strip of bimetal. This produces two separate leg portions 46 and 47 having a substantial width and being capable of moving independently of each other. The leg portion 46 is adapted to engage the abutment 32 provided on the arm 31 as shown in Fig. 4 and the leg portion 47 is adapted to engage the abutment 40 provided on the arm 37 as shown in Fig. 5. The bimetallic element 44 is mounted on the plate so that upon an increase in temperature its legs 46 and 47 will deflect to the right as shown in Figs. 6 and 7. The deflection of the bimetallic element produces a similar movement to the right of the pivoted arms 31 and 37.

Each of the pivoted arms 31 and 37 is adapted to control the actuation of separate circuit controlling mechanisms which have specific circuit controlling functions to be described more fully herebelow. The circuit controlling mechanism which lies in the right-hand side of the casing 19, as viewed in Fig. 2, and which is actuated by the arm 31 comprises a column spring 48 which is secured at its lower end by means of a rivet 49 to the flanged portion 50 provided on the channel member 24. The upper end of this column spring is secured by means of a rivet 51 to a flange portion 52 provided at the upper end of the channel member 24. The column spring 48 is prestressed so that it has two equilibrium positions, one of which is the position shown in Fig. 4 and the other of which is the position shown in Fig. 6. This spring is adapted to be engaged by the projection 33 provided on the pivoted arm 31 and when the arm 31 is moved to the right by the leg 46 of the bimetallic element in response to an increase in temperature, the projection 33 is moved into engagement with the column spring and applies a force thereto sufficient to cause it to move quickly and with a snap action from its equilibrium position shown in Fig. 4 to its position shown in Fig. 6. In order to adjust the stress in the column spring, the flange portion 52 is provided with an opposite projection 53 in which is threadedly mounted an adjusting screw 54 having a rounded end adapted to engage the column spring near its upper end as shown in Fig. 4. By varying the position of the adjusting screw 54, the stress in the column spring may be regulated so that a greater or less force is required to cause it to snap from one equilibrium position to another.

Mounted in back-to-back relationship on the column spring 48 near its lower end are two contact buttons 55 and 56. The contact button 55 is adapted to cooperate with a contact button 57 to perform a circuit controlling function and the contact button 56 is adapted to cooperate with a contact button 58 to perform a different circuit controlling function. As shown in Figs. 3 and 4, the contact button 57 is mounted on the end of a contact arm 59 which is secured by means of screws 60 to an abutment 61 formed in the lower end of the rear wall 22 of the casing. As shown more clearly in Fig. 3, the bracket 59 is adapted to extend upwardly from the center of the bottom portion of the casing and outwardly toward the channel member 24. The contact button 58, on the other hand, is mounted on one end of a contact arm 62 which is secured by means of screws 63 to an abutment 64 integrally formed on the rear wall of the casing so as to lie between the channel members 23 and 24.

As was previously pointed out, the U-shaped bracket 28 is threadedly mounted on the collar 27 which is secured to the shaft 26. Thus, by rotating the shaft 26, the bracket 28 may be moved to the right or to the left as viewed in Fig. 4. This movement of the bracket causes the relative relation between the projection 33 provided on the arm 31 and the column spring 48 to be varied so that the amount of movement required by the arm 31 to force the column spring 48 from the position shown on Fig. 4, in which the contacts 56 and 58 are in engagement, to the position shown in Fig. 6, in which the contacts 55 and 57 are in engagement, may be varied. Thus the temperature at which the column spring is moved from its equilibrium position shown in Fig. 4 to its position shown in Fig. 6 may be regulated.

Like the right-hand control mechanism just described, the control mechanism which lies on the left-hand side of the casing 19, as viewed in Fig. 2, and which is adapted to be actuated in accordance with the movement of arm 37 in response to the deflection of the leg portion 47 of the bimetallic element comprises a column spring 65 which is supported at its upper end on a flange portion 66 provided on the channel member 23 and at its lower end on a second flange portion 67 provided on the channel member. Each end of the column spring is secured to the flange portions by means of rivets 68 and suitable washers 69 are provided for properly spacing the column spring 65 relative to the lower flange portion 67 of the channel member. Mounted on the column spring 65 near its lower end is a contact button 70 which is adapted to cooperate with a contact button 71 mounted on the left-hand side of the contact arm 62 supported on the abutment 64. The column spring 65, like the column spring 48, has two equilibrium positions, one of which is shown in Fig. 5 and the other of which is shown in Fig. 7, and it is adapted to move quickly and with a snap action between these two equilibrium positions. In order to adjust the tension in the column spring 65, there is provided an adjusting screw 72 which is similar in construction and operation to the adjusting screw 54. The adjustment of both the screw 54 and the screw 72 is intended to be a factory adjustment so as to insure proper calibration of the control mechanism. As in the case of the shaft 26, rotation of the shaft 34 causes the U-shaped member 36 to be moved to the right from the position shown in Fig. 5 and this movement varies the relation between the abutment 38 and the column spring 65 so that the temperature at which the column spring is snapped from the position shown in Fig. 5 to that shown in Fig. 7 may be regulated.

The contacts 70 and 71 are connected so as to control the energization of an auxiliary heater element 73. As shown in Fig. 5, this heater element is adapted to lie adjacent the base of the bimetallic element 44 so that when energized it will cause a rapid heating of the bimetallic element and hence accelerate its movement to the right.

As previously described a bracket 41 is mounted on the pivoted arm 37 near the end thereof. This bracket is substantially Z-shaped in construction as shown in Fig. 2 and extends inwardly toward the rear wall 22 of the casing 19. Provided on the innermost portion of this Z-shaped member is a contact 74 which is adapted to cooperate with a contact 75 mounted on an arm 76 which, as shown in Figs. 4 and 6, is secured to the flanged portion 52 of the channel member 24 by means of the rivet 51 which holds the upper end of the right-hand column spring 48 in position.

The auxiliary contacts 74 and 75 are adapted to control the temperature at which the coffee is maintained after it has been brewed as will more fully appear hereinafter. In order to adjust this temperature there is provided an adjusting screw 77 which is threadedly mounted in the rear wall 22 of the casing 19 and projects outwardly therefrom as shown in Figs. 1 and 2. The inner end of this adjusting screw is provided with a rounded portion which is adapted to engage the arm 76 so as to prevent its movement to the right as viewed in Fig. 4. With the movement of the arm thus limited, it will be clear that the bracket 41 carried by the pivoted arm 37 may be moved to the right relative to the arm 76 so that the contacts 74 and 75 are moved to the open circuit position. It is thus apparent that by varying the position of the screw 77 the temperature at which the contacts are opened may be readily adjusted.

As previously pointed out, the column springs 48 and 65 are adapted to move with a snap action to their right-hand equilibrium positions shown in Figs. 6 and 7. These column springs will remain in this equilibrium position until they are manually reset. In order to reset the column springs, there is provided a manually operable substantially L-shaped lever 78 which is pivotally mounted on the outside of the casing 19 by means of a pin 79 which extends through the right angle portion of the lever and is received in the side walls 20 and 21 of the casing. This pivoted lever is provided with a downwardly projecting flange 80 and pivotally mounted at the lower end of this flange is a pair of arms 90 and 91 which are adapted to extend through suitable openings provided in the rear wall 22 of the casing and the channel members 23 and 24. Each of these arms is provided with a rounded end portion which is adapted to engage the adjacent column spring and these arms are normally held out of engagement with the column springs by means of a resilient member 92 which is suitably secured to the rear wall of the casing 19 and biases the lever 78 in the counterclockwise direction against the stop pins 93 provided in each side wall 20 and 21. When both of the column springs have snapped to the right as shown in Figs. 6 and 7, the distance between the column spring and the end of the arms 90 and 91 is a minimum and by pressing downwardly on the pivoted lever 78 the arms 90 and 91 can be moved inwardly so that they engage the column springs 48 and 65 respectively and force them to the left an amount sufficient to cause them to snap to their left-hand equilibrium position shown in Figs. 4 and 5.

In Fig. 9 I have shown a diagram of connections between the various elements of my control arrangement and the heating element 18 of the stove. As shown in this figure, one terminal of the heating unit 18 will be connected by a suitable lead 94 to one side of a suitable source of supply and the other end of the heating element 18 will be connected by a suitable lead 95 to a suitable terminal (not shown) provided at the lower end of the channel member 24. The opposite side of the supply line will be connected by a suitable lead 96 to a suitable terminal (not shown) provided at the lower end of the channel member 23. As previously explained, one end of the heating element 73 is connected to the contact 71 and the opposite end of this heating element is connected by means of the lead 97 to the lower end of the arm 59 upon which is supported the contact element 57. The contacts 71 and 58 are electrically interconnected by means of the common contact arm 62 on each end of which one of these contacts is mounted. As shown in Figs. 5, 7 and 9 a suitable flexible lead 98 is soldered at one end to the arm 37 and at its opposite end to the flange in order to provide a shunt path for the current when the auxiliary contacts 74—75 are closed.

Considering now the operation of my improved coffee making apparatus and control therefor, it will be assumed that the container 10 has been filled with the proper amount of cold water and that the coffee receptacle 13 has been filled with the proper amount of fresh coffee. It will also be assumed that the receptacle has been placed in the position shown and that the stove has been connected to a suitable source of supply (not shown). With everything in this cold condition, the position of the various elements of the control device will be as shown in Figs. 4 and 5 which position corresponds to the position of the various contacts shown in Fig. 9. With the contacts in this position, it will be observed that the heating element of the stove is energized through the following circuit: from one side of the line through the lead 94, the stove 18, lead 95, the channel member 24, the column spring 48, the closed switch contacts 56—58, the bracket 62, the closed switch contacts 70—71, the column spring 65, the channel member 23, and the lead 96 back to the other side of the line. With the stove thus energized the water in the coffee receptacle will start to heat. As the water heats up, heat is transmitted by radiation and conduction through the glass receptacle to the metallic side wall 42 of the control casing and thence by conduction to the bimetallic element 44. This causes both of the leg members of the bimetallic element to deflect to the right as shown in Figs. 6–7. During the initial deflection of the left-hand leg member 47, its pivoted arm 37 is moved to the right an amount sufficient to cause the contacts 74 and 75 to be opened. As shown in Fig. 9, this has no effect at all on the heating circuit for the heating element of the stove.

As the temperature of the water rises, the leg members 46 and 47 continue to deflect to the right as viewed in Figs. 4 and 5. Upon the water reaching a predetermined temperature which is controllable in accordance with the setting of the adjusting screw 26 and is preferably a temperature lying between 170° and 180° F., the leg member 46 will have deflected to the right and have caused the arm 31 to be pivoted counterclockwise an amount sufficient to cause the abutment 33 formed therein to engage and snap the column spring 48 to the position shown in Fig. 6. This opens the contacts 56 and 58 and closes the contacts 55 and 57 which has the effect of removing the shunt previously existing across the auxiliary heater 73. The heater is then energized through a circuit which may be traced as follows: from one side of the line through the lead 94, the stove unit 18, the lead 95, the channel member 24, the column spring 48, the closed contacts 55 and 57, the lead 97, the auxiliary heater 73, the bracket 62, the closed contacts 70 and 71, the column spring 65, the channel member 23 and the lead 96 to the other side of the line. It is to be observed that the removal of the shunt on the auxiliary heater has no effect on the energization of the heating unit 18 and thus the water in the container is continuously heated. At the time that the column spring 48 is snapped to the right as previously described, percolation has begun and it will continue as long as heat is supplied to the coffee maker.

With the heater 73 energized, an additional amount of heat is supplied at the base of the bimetallic member. This additional heat causes this member to deflect to the right at an accelerated rate. After a predetermined additional deflection at this accelerated rate, the extent of which is determined by the adjustment of the adjusting screw 34, the left-hand leg member 47 of the bimetallic element will cause the abutment 38 carried on the pivoted arm 37 to engage the column spring 65 to cause it to snap to the right to the position shown in Fig. 7 whereby the contacts 70 and 71 are moved to the open circuit position. The opening of these contacts causes both the stove until 18 and the auxiliary heater 73 to be deenergized. Since the stove unit is one designed to have a very low heat storage capacity, as previously described, it will be rapidly cooled and percolation will cease a very short time after the contacts 70 and 71 have been opened.

This completes the brewing of the particular quantity of coffee and the contents of the container will now start to cool. As this cooling continues, the legs of the bimetallic element will deflect to the left causing the arms 31 and 37 likewise to be moved to the left. The position of both column springs during this cooling action, of course, remains unchanged and hence the relative positions of the contacts for controlling the stove and auxiliary heater remain unchanged.

With the deflection of the leg portion 47 to the left, the pivoted arm 37 and the bracket 41 mounted thereon likewise move to the left under the influence of the spring 39. At a predetermined decrease in temperature of the brew within the container the contacts 74 and 75 are closed. As shown in Fig. 9, this causes the heating element of the stove to be energized through the following circuit: from one side of the line through the lead 94, the heater element 18, the lead 95, the channel member 24, the arm 76, the contacts 75 and 74, the bracket 41, the arm 37, the flexible connector 98, the channel member 23, and the lead 96 to the other side of the line. With the stove thus energized, the temperature of the brew will be raised and after a slight increase in temperature the contacts 74 and 75 will be open. Thus the contacts 74 and 75 will be periodically opened and closed to maintain a predetermined temperature of the brew, which temperature is preselected by the positioning of the adjusting screw 77 as previously described.

When it is desired to condition the control for a second automatic coffee making operation, it is merely necessary to press downwardly on the lever 78. This causes the arms 90 and 91 to engage the column springs 48 and 65 respectively and to force them to the position shown in Figs. 4 and 5. The contact means are then in the position shown in Fig. 9 and the brewing cycle may be repeated after the receptacle has been recharged.

From the foregoing it will be observed that I have provided a new and improved control device by which a coffee making apparatus of the percolator type may be made completely automatic in operation. In other words, in my improved control device a coffee maker of the percolator type may be charged with a quantity of cold water and fresh coffee and placed on the heating element 18 and automatically brewed to the desired strength and temperature without further attention on the part of the operator. It will be particularly observed that I have provided an automatic control device in which both the length of time that the coffee is brewed and the temperature at which the brewing takes place may be regulated. As is well known in the art of making coffee by percolation, the strength of the brew is proportional to both of these factors and in the improved control device covered by this invention both elements are regulatable so as to produce a brew suitable to the taste of the particular user. Moreover, it will be observed that I have provided a new and improved control device by which the brew, once it has been prepared, may be maintained at a predetermined temperature which may be adjusted to suit the desire of the particular user.

In addition to the foregoing, it will be observed that I have provided a new and improved control device for effecting automatic operation of coffee infusion apparatus which control device is adapted to be manually reset so that a second quantity of coffee may be brewed immediately upon the completion of the first quantity. Moreover, by means of the manually reset arrangement, it is possible to charge the coffee receptacle with a quantity of fresh coffee and cold water and bring this water up to a brewing temperature but to delay the actual brewing of the coffee until a short time before it is desired. This is accomplished by leaving the column springs 48 and 65 in the equilibrium position shown in Figs. 6 and 7 until the quantity of water has been heated to a predetermined temperature which is regulated by means of the adjusting screw 77. By the cycling of the contacts 74 and 75, the water wil be maintained at this predetermined temperature until it is desired to start the brewing operation which is accomplished by pressing the manual reset lever 78 thus forcing the column springs to the equilibrium position shown in Figs. 4 and 5 whereupon the automatic brewing of the coffee in acordance with the setting of the control arms 26 and 34 will take place.

While this invention has been described with particular reference to its application as a control device for effecting automatic operation of a coffee infusion apparatus, it will be readily understood that the control device is not limited to such an application but may be employed on any cooking apparatus where a time cooking period, which is dependent upon the constituents reaching a predetermined temperature, is desired. Moreover, while only a single modification of this invention has been described, it will be apparent that many modifications may be made, and I, therefore, contemplate by the appended claims to cover any such modifications as fall within the true spirit and scope of my invention.

What I claim as new and desire to secure by Letters Patent of the United States is:

1. A control device comprising a temperature responsive element, control means responsive to movement of said temperature responsive element for initiating a timed interval, control means responsive to further movement of said temperature responsive element for terminating said timed interval, and control means operable after the lapse of said timed interval for maintaining a predetermined temperature in accordance with movement of said temperature responsive element.

2. A control device for timing the cooking of a substance after the substance has reached a predetermined temperature and for therafter maintaining said substance at a predetermined lower temperature comprising, a temperature responsive element, means for accelerating the movement of said temperature responsive element, means actuated in accordance with movement of said temperature responsive means for initiating the movement of said accelerating means when the substance has reached a predetermined temperature, means responsive to the movement of said temperature responsive means under the influence of said accelerating means for terminating the operation of said accelerating means after a predetermined time whereby a cooking interval of a predetermined length is defined, and means responsive to the movement of said temperature responsive means after the operation of said accelerating means is terminated for maintaining a predetermined temperature in accordance with the deflection of said temperature responsive means in response to the heat conducted thereto from said substance.

3. A control device for producing a predetermined cooking interval for a substance after the substance has reached a predetermined temperature and for maintaining the substance at a predetermined lower temperature upon the completion of said cooking interval comprising a temperature responsive element adapted to be moved in accordance with temperature changes of said substance, means for accelerating the movement of said temperature responsive element independently of the heat transmitted thereto from said substance, means for operating said accelerating means when said substance has reached a predetermined temperature so as to initiate a timed cooking interval for said substance, means for varying the temperature at which said accelerating means is operated, means for terminating the operation of said accelerating means after a predetermined movement of said temperature responsive means to terminate the timed cooking interval for said substance, means for adjusting the amount of movement required of said temperature responsive means to cause said terminating means to be operated, and means operable in accordance with the movement of said temperature responsive means after the termination of said cooking interval for maintaining said substance at a predetermined temperature.

4. In a temperature responsive control device for producing a predetermined cooking interval for a substance after the substance has reached a predetermined temperature and for maintaining the substance at a predetermined lower temperature, a temperature responsive element adapted to deflect in accordance with the temperature of the substance being prepared, a separate auxiliary heating unit for supplying additional heat to said temperature responsive element to cause a further deflection of said element, adjustable means actuated by said temperature responsive element for causing the energization of said auxiliary heating unit at a preselected temperature to initiate said timed cooking interval, adjustable means actuated by the further deflection of said temperature responsive element under the influence of said auxiliary heater for causing the deenergization of said auxiliary heating unit after a predetermined time to terminate said cooking interval, and means responsive to the deflection of said temperature responsive means in response to temperature changes of said substance after said cooking interval is terminated for maintaining a predetermined lower temperature of said substance.

5. A control device for timing a medium to be cooked for a predetermined interval after it has reached a predetermined temperature and for thereafter maintaining said medium at a predetermined lower temperature comprising, a casing having a metallic side wall adapted to be mounted in good thermal relation with the medium being prepared, a temperature responsive element mounted on said side wall, means responsive to the predetermined movement of said temperature responsive element for initiating the timed cooking interval after said medium has reached a predetermined temperature, means for adjusting said first mentioned means to vary the amount of movement of said temperature-responsive element required to actuate said initiating means, means responsive to further movement of said temperature responsive element for terminating said timed cooking interval, means for adjusting said terminating means so that the length of said time interval may be varied, and additional means responsive to the deflection of said temperature responsive element after the termination of said time interval for maintaining said medium at a predetermined temperature.

6. In a control device for timing the cooking of a substance after the substance has reached a predetermined temperature and for thereafter maintaining said substance at a predetermined lower temperature comprising, a temperature responsive element, a first control means actuated by the deflection of said temperature responsive element for initiating a time interval, a second control means actuated by an additional deflection of said temperature responsive element for terminating said time interval, a third control means operable after the actuation of said first and second control means and actuated in accordance with the deflection of said temperature responsive element to maintain a predetermined temperature, means for adjusting the amount of deflection required of said temperature responsive element to actuate said first control means so that the temperature at which said timed cooking interval is initiated may be varied, means for adjusting the amount of deflection required by said temperature responsive element to actuate said second control means so that the length of said timed cooking interval may be varied, and means for adjusting the amount of deflection required by said temperature responsive element to actuate said third control means after the actuation of said first and second control means so that the temperature to be maintained may be varied.

7. A control device for a coffee infusion apparatus comprising a temperature responsive element adapted to be moved in accordance with temperature changes of the liquid in said coffee infusion apparatus, control means adapted to be moved after a predetermined movement of said temperature responsive element for initiating a timed brewing interval, means for adjusting said control means to vary the temperature at which said timed brewing interval is initiated, control means responsive to further movement of said temperature responsive element for terminating said timed brewing interval, means for adjusting said last mentioned control means so that the length of said brewing interval may be varied, and additional control means responsive to the movement of said temperature responsive element after the termination of said timed brewing interval for maintaining a predetermined temperature of said brew in said coffee infusion apparatus.

8. A control device for a coffee infusion apparatus having a receptacle adapted to be mounted on an electrically heated stove element, comprising, a casing adapted to be mounted on said stove element in close proximity to said receptacle, said casing having at least one side wall made from a good heat conducting material, a temperature responsive element associated with said side wall so as to deflect in accordance with the heat transmitted thereto from said receptacle, a first control arm adapted to be moved by said temperature responsive element after a predetermined deflection thereof, control means actuated by movement of said first control arm for initiating a brewing interval, a second control arm adapted to be actuated by an additional deflection of said temperature responsive member, control means actuated by the movement of said second mentioned control arm for terminating said brewing interval, and means mounted on said first mentioned control arm and adapted to be moved therewith to control the energization of said stove element to maintain a predetermined temperature of the fluid in said receptacle after the termination of said brewing interval.

9. A control device for a coffee infusion apparatus having a receptacle and a main heating element, comprising, a casing, a temperature responsive element in said casing adapted to move in response to the heat transmitted thereto from said receptacle, an auxiliary heater in said casing mounted adjacent said temperature responsive means so that when energized said auxiliary heater produces an accelerated movement of said temperature responsive means, means responsive to a predetermined movement of said temperature responsive element in accordance with heat transmitted thereto from said receptacle for initiating the energization of said auxiliary heater to initiate a brewing interval when the contents of said receptacle reach a predetermined temperature under the influence of said main heating means, means responsive to a predetermined accelerated movement of said temperature responsive element in response to heat from said auxiliary heater for terminating said timed brewing interval by deenergizing said auxiliary heater and said main heater, and means responsive to the deflection of said temperature responsive means after the lapse of said timed brewing interval for controlling the energization of said main heating means to maintain a predetermined temperature of the member in said receptacle.

10. A control device for a coffee infusion apparatus having a fluid receptacle, comprising, a casing having a side wall of good heat transmitting material adapted to be mounted in close proximity to said receptacle, a temperature responsive member mounted on said side wall and adapted to move in accordance with the heat transmitted to said side wall from said receptacle, an auxiliary heater mounted adjacent said temperature responsive element, control means in said casing adapted to be actuated in accordance with a predetermined movement of said temperature responsive element to energize said auxiliary heater, means for adjusting said control means so that the temperature at which said auxiliary heater is energized may be varied, second control means adapted to be actuated by the additional deflection of said temperature responsive element in response to the heat from said auxiliary heater for terminating the energization of said auxiliary heater after a predetermined time, means for adjusting said second control means so that the length of time said auxiliary heater is energized may be regulated, and third control means adapted to be actuated by said temperature responsive element after the operation of said first and second mentioned control means to regulate the temperature of the fluid in said receptacle.

11. A control device for a coffee infusion apparatus having a receptacle and main heating means therefor comprising a casing, a side wall in said casing made of good heat transmitting material adapted to be mounted in close proximity to said receptacle, a bifurcated temperature responsive element mounted on the inside surface of said side wall, an auxiliary heating element mounted adjacent said temperature responsive element, a control arm adapted to be moved in accordance with the movement of one leg of said bifurcated temperature responsive element, snap action control means adapted to be actuated in accordance with the movement of said control arm for controlling the energization of said auxiliary heater element, means for varying the relation between said control arm and said snap action means so as to adjust the temperature at which said auxiliary heating element is energized, a second control arm adapted to be actuated in accordance with the movement of the second leg portion of said bifurcated temperature responsive element, snap action control means actuated in accordance with the movement of said second control arm to terminate the energization of said auxiliary heating element, said last mentioned snap action control means also causing the deenergization of the main heating means to terminate the application of heat to said receptacle, and means for adjusting the relation between said second control arm and said second snap action control means to vary the length of time said auxiliary heater is energized.

12. A control device for a coffee infusion apparatus having a receptacle and main heating means therefor, comprising, a casing, a side wall in said casing made of a good heat transmitting material adapted to be mounted in close proximity to said receptacle, a bifurcated temperature responsive element mounted on said side wall, an auxiliary heating element mounted adjacent said temperature responsive element, a control arm adapted to be moved in accordance with the movement of one leg of said bifurcated temperature responsive element, snap action control means adapted to be actuated in accordance with the movement of said control arm for controlling the energization of said auxiliary heater element without effecting the energization of said main heating element, said auxiliary heating element increasing the heat supplied to said temperature responsive element to cause said temperature responsive element to move at an accelerated rate, means for varying the relation between said control arm and said snap action means so as to adjust the temperature at which said auxiliary heating element is energized, a second control arm adapted to be actuated in accordance with the movement of the second leg portion of said bifurcated temperature responsive element upon the acceleration of said temperature responsive element in response to the heat supplied by said auxiliary heater, snap action means actuated in accordance with the movement of said second control arm to terminate the energization of both said auxiliary heating element and said main heating element, means for adjusting the relation between said second control arm and said second snap action control means to vary the amount of movement required of said second leg portion of said temperature responsive element in order to actuate said second control means, and means associated with said first control arm for controlling the energization of said main heating means after the actuation of both of said snap action means to maintain a predetermined temperature in said receptacle.

13. A control device for a coffee infusion apparatus having a receptacle and a main heating element therefor, comprising, a casing adapted to be mounted adjacent one wall of said receptacle, a temperature responsive element mounted in said casing and adapted so as to be in good thermal relation with said receptacle so that said element moves in accordance with temperature changes of the liquid in said receptacle, an auxiliary heater mounted adjacent said temperature responsive element so that when energized it accelerates the movement of said element, a first control arm pivotally mounted in said casing so as to be moved in accordance with the movement of said temperature responsive element, a first column spring associated with said first control arm having two equilibrium positions one of which is unaffected by the movement of said control arm, means for varying the relation between said first control arm and said first column spring to control the deflection required of said temperature responsive element to cause said first control arm to snap said column spring to said one position, means on said column spring for causing the energization of said auxiliary heater when it has been snapped to said one position without affecting the energization of said main heating element, a second control arm pivotally mounted in said casing so as to be moved in accordance with the movement of said temperature responsive element under the influence of said auxiliary heater, a second column spring associated with said second control arm having two equilibrium positions one of which is unaffected by the movement of said second control arm, means for varying the relation between said second control arm and said second column spring to vary the amount of additional deflection required of said temperature responsive element under the influence of said auxiliary heater to cause said second control arm to actuate said second column spring and hence to vary the time interval between the snap movement of said first and second column springs, means on said second column spring for deenergizing said main and auxiliary heater elements when said second spring is snapped to said one equilibrium position, and means pivotally mounted on said casing for manually causing said column springs to be moved from said one equilibrium position to their other equilibrium position in which they are adapted to be engaged by said first and second control arms.

HEBER L. NEWELL.